(12) United States Patent
Neuman et al.

(10) Patent No.: US 8,947,503 B2
(45) Date of Patent: Feb. 3, 2015

(54) METHOD AND SYSTEM FOR PROCESSING 3-D VIDEO

(75) Inventors: Darren Neuman, Palo Alto, CA (US);
Jason Herrick, Pleasanton, CA (US);
Christopher Payson, Bolton, MA (US);
Qinghua Zhao, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 406 days.

(21) Appl. No.: 12/963,320

(22) Filed: Dec. 8, 2010

(65) Prior Publication Data

US 2011/0134212 A1 Jun. 9, 2011

Related U.S. Application Data

(60) Provisional application No. 61/296,851, filed on Jan. 20, 2010, provisional application No. 61/267,729, filed on Dec. 8, 2009, provisional application No. 61/330,456, filed on May 3, 2010.

(51) Int. Cl.
*H04N 13/00* (2006.01)

(52) U.S. Cl.
CPC ...... *H04N 13/0029* (2013.01); *H04N 2213/007* (2013.01)
USPC .................................... 348/42; 348/E13.064

(58) Field of Classification Search
None
See application file for complete search history.

(56) References Cited

U.S. PATENT DOCUMENTS

| | | | |
|---|---|---|---|
| 8,339,442 B2 * | 12/2012 | Miyauchi et al. | 348/43 |
| 2002/0047930 A1 * | 4/2002 | Zhou | 348/578 |
| 2004/0218269 A1 * | 11/2004 | Divelbiss et al. | 359/464 |
| 2005/0134735 A1 * | 6/2005 | Swartz | 348/554 |
| 2006/0062490 A1 * | 3/2006 | Ha et al. | 382/298 |
| 2007/0024703 A1 * | 2/2007 | Conklin | 348/97 |
| 2007/0030383 A1 * | 2/2007 | Law et al. | 348/448 |
| 2007/0071344 A1 * | 3/2007 | Ouzilevski et al. | 382/254 |
| 2007/0216808 A1 * | 9/2007 | MacInnis et al. | 348/581 |
| 2007/0252894 A1 * | 11/2007 | Satou et al. | 348/97 |
| 2007/0285563 A1 * | 12/2007 | Chen et al. | 348/441 |
| 2008/0198920 A1 * | 8/2008 | Yang et al. | 375/240.01 |
| 2008/0285652 A1 * | 11/2008 | Oxman et al. | 375/240.16 |
| 2009/0153734 A1 * | 6/2009 | Glen | 348/552 |
| 2010/0149321 A1 * | 6/2010 | Ushiki et al. | 348/51 |
| 2010/0254453 A1 * | 10/2010 | Dane et al. | 375/240.12 |
| 2011/0254929 A1 * | 10/2011 | Yang et al. | 348/51 |
| 2013/0044192 A1 * | 2/2013 | Mukherjee et al. | 348/51 |

* cited by examiner

*Primary Examiner* — Christopher S Kelley
*Assistant Examiner* — Kaitlin A Retallick
(74) *Attorney, Agent, or Firm* — Foley & Lardner LLP; Christopher J. McKenna; Paul M. H. Pua

(57) ABSTRACT

A video processing system may receive a first frame comprising pixel data for a first 3-D view of an image, which may be referred to as first 3-D view pixel data, and receive a second frame comprising pixel data for a second 3-D view of the image, which may be referred to as second 3-D view pixel data. The system may generate a multi-view frame comprising the first 3-D view pixel data and the second 3-D view pixel data. The system may make a decision for performing processing of the image, wherein the decision is generated based on one or both of the first 3-D view pixel data and/or the second 3-D view pixel data. The system may process the 3-D multi-view frame based on the decision. The image processing operation may comprise, for example, deinterlacing, filtering, and cadence processing such as 3:2 pulldown.

20 Claims, 4 Drawing Sheets

US 8,947,503 B2

METHOD AND SYSTEM FOR PROCESSING 3-D VIDEO

CLAIM OF PRIORITY

This patent application makes reference to, claims priority to and claims benefit from:
U.S. Provisional Patent Application Ser. No. 61/296,851 filed on Jan. 20, 2010;
U.S. Provisional Patent Application Ser. No. 61/267,729 filed on Dec. 8, 2009; and
U.S. Provisional Patent Application Ser. No. 61/330,456 filed on May 3, 2010.

Each of the above stated applications is hereby incorporated herein by reference in its entirety.

INCORPORATION BY REFERENCE

This patent application also makes reference to:
U.S. Provisional patent application Ser. No. 12/963,212 filed on Dec. 8, 2010;
U.S. Provisional patent application Ser. No. 12/963,014 filed on Dec. 8, 2010;
U.S. Provisional patent application Ser. No. 12/962,995 filed on Dec. 8, 2010; and
U.S. Provisional patent application Ser. No. 12/963,035 filed on Dec. 8, 2010.

FIELD OF THE INVENTION

Certain embodiments of the invention relate to video processing. More specifically, certain embodiments of the invention relate to a method and system for processing 3-D video.

BACKGROUND OF THE INVENTION

Support of three-dimensional (3-D) video presents many complexities that are not addressed in conventional two-dimensional (2D) video processing systems. The rapid growth of 3-D video systems has resulted in inconsistent and inadequate ways of dealing with these complexities.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for processing 3-D video, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Various embodiments of the invention may be found in a method and system for processing 3-D video. In various embodiments of the invention, a video processing system may receive a first frame comprising pixel data for a first 3-D view of an image, which may be referred to as first 3-D view pixel data, and receive a second frame comprising pixel data for a second 3-D view of the image, which may be referred to as second 3-D view pixel data. The system may generate a multi-view frame comprising the first 3-D view pixel data and the second 3-D view pixel data. The system may make a decision for performing processing of the image, wherein the decision is generated based on one or both of the first 3-D view pixel data and/or the second 3-D view pixel data. The system may process the 3-D multi-view frame based on the decision. The image processing operation may comprise, for example, deinterlacing, filtering, and/or cadence processing such as 3:2 pulldown. For 3:2 pulldown, the decision may determine whether the pixel data originated as video or film.

The multi-view frame may be arranged such that a left portion of the multi-view frame comprises the first 3-D view pixel data and a right portion of the multi-view frame comprises the second 3-D view pixel data. The multi-view frame may be arranged such that a top portion of the multi-view frame comprises the first 3-D view pixel data and a bottom portion of the multi-view frame comprises the second 3-D view pixel data. The multi-view frame may be arranged such that the first 3-D view pixel data is interleaved with the second 3-D view pixel data. The generated decision may be based on a first preliminary decision based on the first 3-D view pixel data, and a second preliminary decision based on the second 3-D view pixel data. The decision may be an average, whether weighted or unweighted, and/or a compromise or blend between the first preliminary decision and the second preliminary decision. The multi-view frame may be generated by writing the first 3-D view pixel data to one or more locations in memory identified by a first one or more pointers, and writing the second 3-D view pixel data to one or more locations in memory identified by a second one or more pointers. The first 3-D view pixel data and the second 3-D view pixel data may be read from memory in an order that is different than an order in which the first 3-D view pixel data and the second 3-D view pixel data was written to memory. As utilized herein a "3-D" view refers to one view (i.e., a left view or a right view) of a stereoscopic image, "3-D" pixel data refers to pixel data of one or both views of a stereoscopic image, and "3-D" video refers to stereoscopic video.

Figure 1:
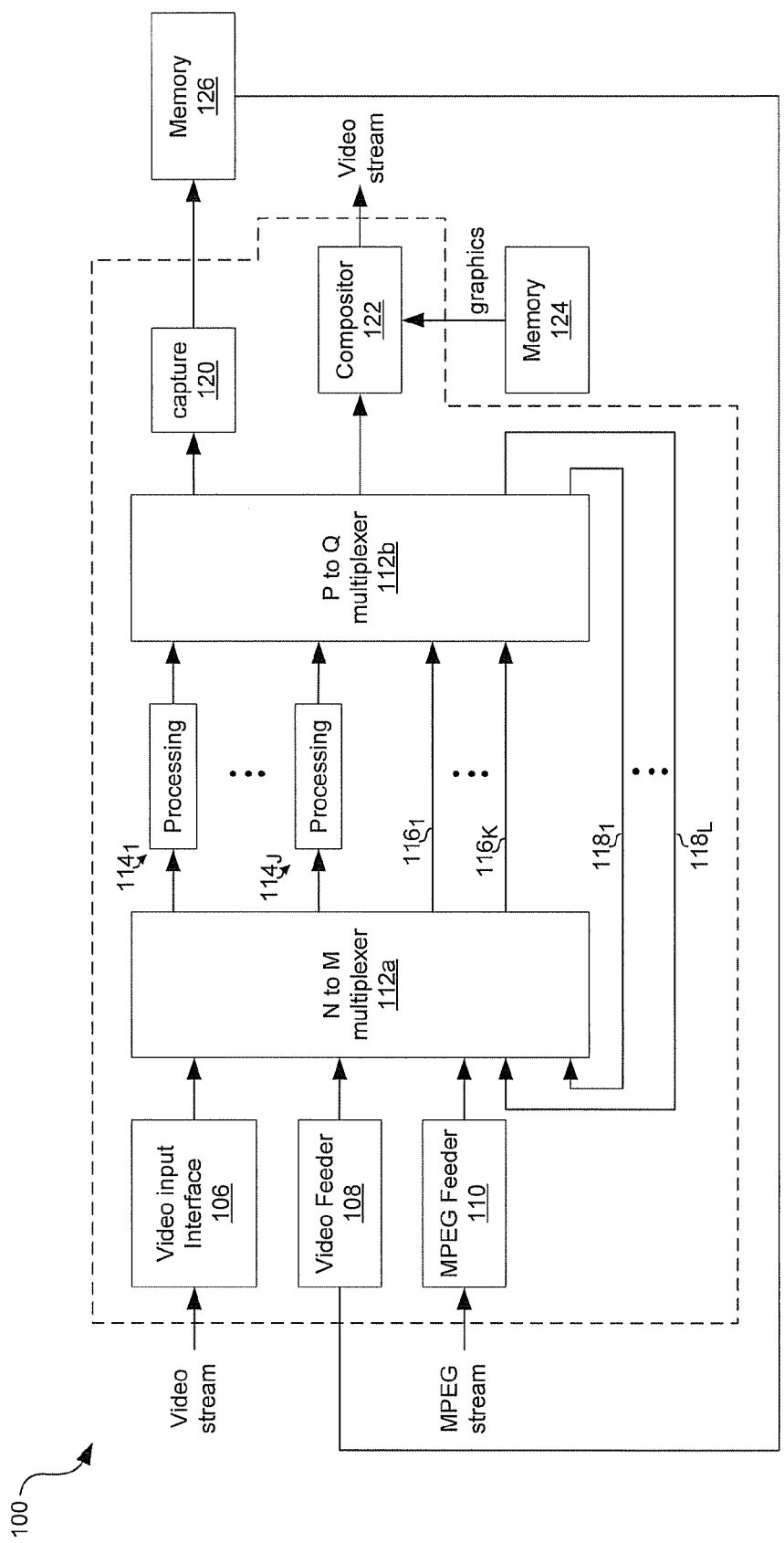
FIG. 1 is diagram illustrating a video processing system, in accordance with an embodiment of the invention.

FIG. 1 is diagram illustrating a video processing system, in accordance with an embodiment of the invention. Referring to FIG. 1, the video processing system 100 comprises video input interface 106, video feeder 108, MPEG feeder 110, multiplexers 112a and 112b, processing paths $114_1$-$114_J$, bypass paths $116_1$-$116_K$, loopback paths $118_1$-$118_L$, capture module 120, compositor 122, memory 124, and memory 126. Each of J, K, and L is an integer greater than or equal to 1. In various embodiments of the invention, the system 100 may, for example, reside in a set-top box, a television, or a desktop or laptop computer. In an exemplary embodiment of the invention, the system 100 may be implemented in single semiconductor die or "chip." A chip may comprise, for example, an ASIC or an FPGA. In an exemplary embodiment of the invention, the portion of the system 100 enclosed in the dashed line comprise a single-chip video processor.

Each of the memory 124, and the memory 126 may comprise RAM, ROM, NVRAM, flash, a hard drive, or any other suitable memory device. The memory 124, and memory 126 may be physically distinct memory elements of may be different portions and/or partitions of a single memory device.

The video input interface 106 may comprise suitable logic, circuitry, interfaces, and/or code that may be operable to receive a video stream and convey the pixel data of the video stream to the multiplexer 112a. The video input interface 106 may comprise, for example, a VGA interface, composite video interface, component video interface, HDMI interface, DisplayPort interface, and/or other suitable interface and the video stream into the interface 106 may be formatted accordingly. The received video stream may comprise monoscopic (2-D) video data and/or stereoscopic (3-D) video data. While this application focuses on processing of received 3-D video streams. Exemplary details of processing 2-D video streams are described in U.S. patent application Ser. No. 12/962,995 and in U.S. patent application Ser. No. 12/963,035 each of which is incorporated by reference above.

The video feeder 108 may comprise suitable logic, circuitry, interfaces, and/or code that may be operable to input pixel data corresponding to locally generated graphics to the multiplexer 112a. In this regard, the video feeder 108 may, for example, read pixel data out of the memory 126 and convey the pixel data to the multiplexer 112a.

The MPEG feeder 110 may comprise suitable logic, circuitry, interfaces, and/or code. The MPEG feeder 110 may be operable to receive an MPEG stream and process the MPEG stream to output pixel data to the multiplexer 112a. In this regard, the MPEG stream may be received via a networking device (not shown).

Each of the multiplexers 112a and 112b may comprise suitable logic, circuitry, interfaces, and/or code that may be operable to route pixel data between any one or more inputs of the multiplexer to any one or more outputs of the multiplexer. Pixel data input to the multiplexer 112a from any one of more of the interface 106, feeder 108, and the feeder 110 may be conveyed to any one or more of the processing paths $114_1$-$114_J$ and/or any one or more of the bypass paths $116_1$-$116_K$. Each of the processing paths $114_1$-$114_J$ may comprise suitable logic, circuitry, interfaces, and/or code that may be operable to perform one or more processing functions. Exemplary processing functions comprise scaling, subsampling, deinterlacing, 3:2 pulldown, blur/sharpen, color adjustment, and/or filtering operations such as motion compensated temporal filtering and digital noise reduction. Each of the bypass paths $116_1$-$116_K$ may enable pixel data to be conveyed unchanged from the multiplexer 112a to the multiplexer 112b. Each of the loopback paths $118_1$-$118_L$ may enable pixel data to be conveyed from the multiplexer 112b to the multiplexer 112a. In this manner, the loopback paths may, for example, enable processing the same pixel data via multiple ones of the processing paths $114_1$-$114_J$.

The capture module 120 may comprise suitable logic, circuitry, interfaces, and/or code. The capture module 120 may be operable to write 3-D pixel data to and from memory 126. The capture module 120 may be operable to read and write first 3-D view pixel data to and from the memory 126 utilizing a first one or more memory pointers. The capture module 120 may be operable to read and write second 3-D view pixel data to memory 126 utilizing a second one or more memory pointers. First 3-D view pixel data may be left-view data, and second 3-D view pixel data may be right-view pixel data, or visa-versa. For example, left-view pixel data may be captured via a left lens of a video camera and right-view pixel data may be captured via a right lens of the video camera.

The compositor 122 may comprise suitable logic, circuitry, interfaces, and/or code. The compositor 122 may be operable to generate a video stream which may be output via, for example, a VGA output, composite video output, component video output, HDMI output, and/or DisplayPort output. The video stream may comprise pixel data received from the multiplexer 112b and/or pixel data read from memory 124. In this regard, the compositor 122 may be operable to combine (e.g. overlay) pixel data from the memory 124 onto pixel data from the multiplexer 112b, or visa-versa. The output video stream may comprise monoscopic (2-D) video data and/or stereoscopic (3-D) video data. While this application focuses on outputting 3-D video streams. Exemplary details of processing 2-D video streams are described in U.S. patent application Ser. No. 12/962,995 and in U.S. patent application Ser. No. 12/963,035 each of which is incorporated by reference above.

In operation, one or more 3-D video frames may be input to the system 100 via one or more of the interface 106, the feeder 108, and the feeder 110. Each of the one or more input frames may comprise live-action images and/or computer-generated images. The input frame(s) may comprise left-view pixel data and right-view pixel data. The arrangement of the input frame(s) may correspond to any one of the arrangements described below with respect to FIG. 2. The arrangement of the input frame(s) may be determined in any of a variety of ways. For example, the system 100 may determine the arrangement of the input frame(s) based on the source from which the one or more frames was received, based on a state of one or more control signals in the system 100, and/or based on an inspection the input frame(s).

The multiplexer 112B may convey the input frame(s) to the multiplexer 112b via one or more of the processing paths $114_1$-$114_J$ and/or one or more of the bypass paths $116_1$-$116_K$. The frame(s) may make multiple passes from the multiplexer 112a to the multiplexer 112b and thus may traverse one or more of the loopback paths $118_1$-$118_L$.

In instances that the pixel data traverses one or more of the processing paths $114_1$-114, and the input frame(s) comprise single multi-view frame, a common decision may be utilized for processing both the first 3-D view pixel-data and second 3-D view pixel data. Utilizing only a common decision for processing both the first 3-D view pixel data and the second 3-D view pixel data may prevent making different decisions for the first 3-D view pixel data and the second 3-D view pixel data. Utilizing different decisions for the first 3-D view pixel data and the second 3-D view pixel data may result in a distorted or otherwise visually unappealing image upon combining the two views. For example, for 3:2 pulldown, deciding that the first 3-D view pixel data originated as video but deciding that the second 3-D view data originated as film, may result in a visually unappealing image when the first 3-D view and second 3-D view pixel data are combined. Accordingly, in one embodiment of the invention, the system 100 may make the decision based on only one of the views and then utilize the same decision for the other view. For example, the system 100 may decide that the first 3-D view pixel data originated as video and then also utilize that decision when processing the second 3-D view pixel data, that is, without making a separate decision based on the second 3-D view pixel data. In another embodiment of the invention, the single decision may be based on a combination, or compromise, between a first preliminary decision based on the first 3-D view pixel data and a second preliminary decision based on the second 3-D view pixel data. For example, the system 100 may make a preliminary decision to sharpen the first 3-D view pixel data by a factor of X, make a preliminary decision to sharpen the second 3-D view pixel data by Y, and then a final decision to sharpen both views by (X+Y)/2 or by some other weighing or blending factor.

In instances that the pixel data traverses one or more of the processing paths $114_1$-$114_J$, and the input frame(s) comprise a two-frame-sequential arrangement, processing performed on each of the single-view frames may be limited to operations that do not require a decision to be made based on the content of the frames. Avoiding performance of such processing operations until after the two frames have been converted to a single multi-view frame may prevent making different decisions for the two views and may also avoid the need for memory and/or other circuitry to remember previous decisions and apply previous decisions to subsequent pixel data.

Upon arriving at the multiplexer 112b, after one or more traversals of one or more of the processing paths $114_1$-$114_J$, bypass paths $116_1$-$116_K$, and/or loopback paths $118_1$-$118_L$, the frame(s) may be conveyed to the capture module 120. The capture module 120 may write the left-view pixel data and right-view pixel data to memory 126. The left-view pixel data may be written to one or more memory locations identified by a first one or more pointers. The right-view pixel data may be written to one or more memory locations identified by a second one or more pointers.

Subsequently, the feeder module 108 may read the left-view and right-view pixel data from the memory 126 to generate a multi-view output frame. The first one or more pointers and the second one or more pointers may be utilized for reading the pixel data out from the memory 126. The order in which the pixel data is read from memory may depend on the arrangement of the input frame(s) and the desired arrangement of the multi-view output frame. In this regard, the arrangement of the multi-view output frame read from the memory 126 may correspond to any of the arrangements 204-212 below with respect to FIG. 2. Thus, in instances that the arrangement of the input frame(s) is the same as the arrangement of the multi-view output frame, the pixel data may be read out of the memory 126 in the same order in which it was written to the memory 126. Conversely, in instances that the arrangement of the input frame(s) is the different than the arrangement of the multi-view output frame, the pixel data may be read out of the memory 126 in a different order than which it was written to the memory 126.

The multi-view output frame may be conveyed to the compositor 122. In some instances, prior to being conveyed to the compositor 122, the multi-view output frame may be conveyed to the multiplexer 1128 for one or more traversals of one or more of the processing paths $114_1$-$114_J$, bypass paths $116_1$-$116_K$, and/or loopback paths $118_1$-$118_L$. In instances that the one or more input frames are processed by one or more processing paths $114_1$-$114_J$, the system 100 may ensure that the first 3-D view pixel data and the second 3-D view pixel data are processed consistently with one another such that the 3-D video frame resulting from the combination of the two views is not distorted or otherwise visually unappealing.

The compositor 122 may process the output frame(s) to make the output frame(s) suitable for insertion into a video stream. The video stream may be formatted so as to be compatible with one or more video standards such as VGA, composite video, component video, HDMI, and/or DisplayPort. Processing of the output frame(s) may comprise combining the output frame(s) from the multiplexer 112b with pixel data from memory 124. For example, graphics may be read from the memory 124 and overlaid on the output frame(s) from the multiplexer 112b.

Figure 2:
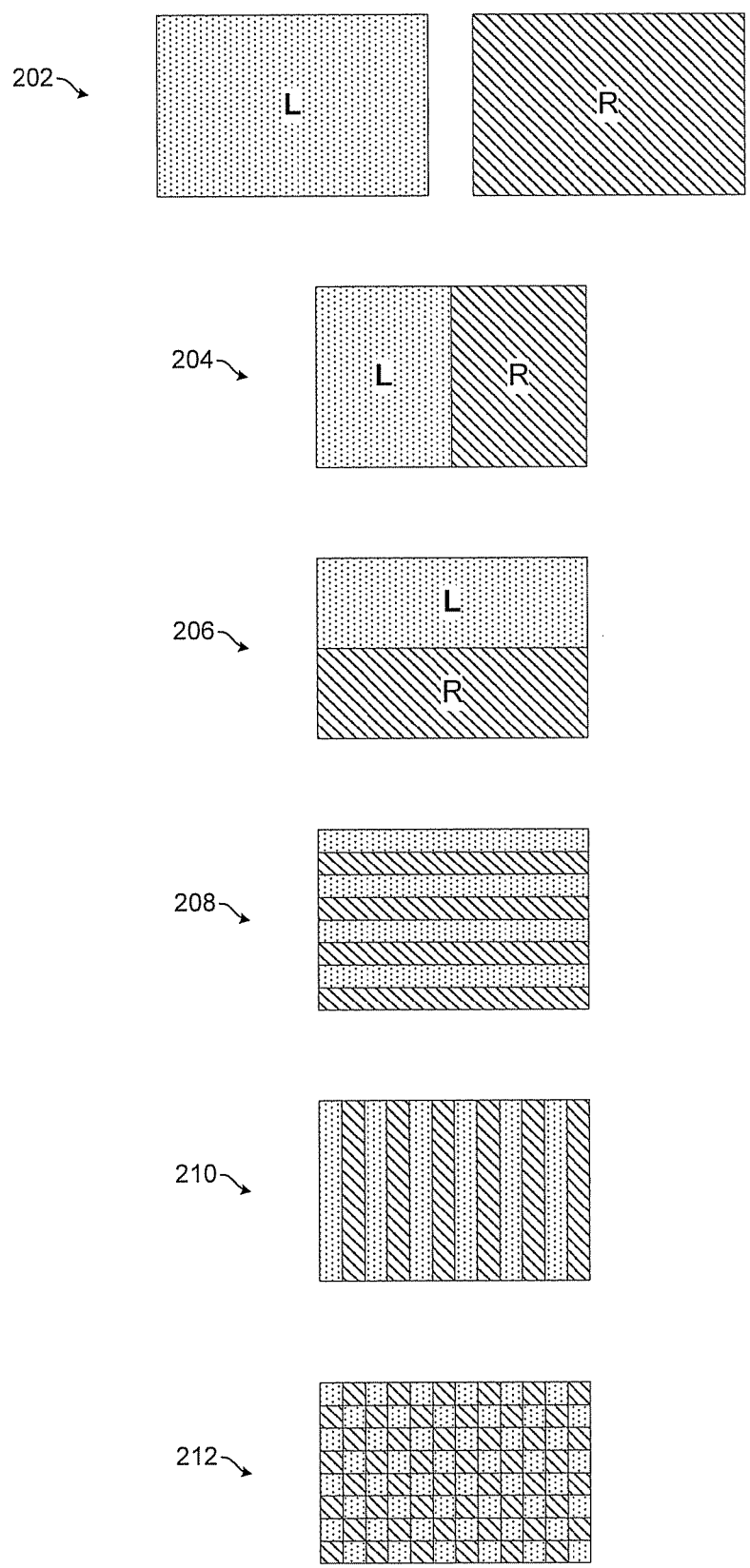
FIG. 2 is a diagram illustrating various arrangements of one or more frames comprising 3-D pixel data, in accordance with an embodiment of the invention.

FIG. 2 is a diagram illustrating various arrangements of one or more frames comprising 2D pixel data, in accordance with an embodiment of the invention. Referring to FIG. 2, there is shown a two-frame-sequential arrangement 202, a left-right-single-frame arrangement 204, an over-under-single-frame arrangement 206, a vertically-interleaved-single-frame arrangement 208, a horizontally-interleaved-single-frame arrangement 210, and a vertically-and-horizontally-interleaved-single-frame arrangement 212. For the following description of the various arrangements, each of N and M may be any positive integer.

The two-frame-sequential arrangement 202 comprises two single-view frames. A first frame comprising first 3-D view pixel data and a second frame comprising second 3-D view pixel data. The two frames may be received by the system 100 sequentially. That is, the first frame may be received earlier in time before the second frame. In an embodiment of the invention, a decision as to how to perform one or more processing operations on the first frame may be utilized for performing the one or more processing operations on both the first frame and the second frame.

The left portion of the left-right-single-frame arrangement 204 may comprise first 3-D view pixel data and the right portion of the left-right single-frame arrangement 204 may comprise second 3-D view pixel data. An exemplary 4M×4N left-right-single-frame arrangement is described in table 1 below. In an embodiment of the invention, a decision as to how to perform one or more processing operations on the multi-view frame may be made based on an inspection and/or analysis of either the first 3-D view pixel data of the right portion of or the second 3-D view pixel data of the right portion. This decision may then be utilized for processing the multi-view frame as a whole. In an embodiment of the invention, the first 3-D view pixel data of the left portion may be inspected and/or analyzed to make a first preliminary decision, the second 3-D view pixel data of the right portion may be inspected and/or analyzed to make a second preliminary decision, and then a final decision for processing the multi-view frame as a whole may be based on the two preliminary decisions. The final decision may, for example, be an average or compromise between the two preliminary decisions.

TABLE 1

| Left-Right-Single-Frame arrangement | | |
|---|---|---|
|  | Col. 1-2M | Col. 2M + 1-4M |
| Lines 1-4N | first 3-D view | second 3-D view |

The top portion of the over-under-single-frame arrangement 206 may comprise first 3-D view pixel data and the bottom portion of the over-under-single-frame arrangement 206 may comprise second 3-D view pixel data. An exemplary 4M×4N over-under-single-frame arrangement is described in table 2 below. In an embodiment of the invention, a decision as to how to perform one or more processing operations on the multi-view frame may be made based on an inspection and/or analysis of either the first 3-D view pixel data of the top portion of or the second 3-D view pixel data of the bottom portion. This decision may then be utilized for processing the multi-view frame as a whole. In an embodiment of the invention, the first 3-D view pixel data of the top portion may be inspected/analyzed to make a first preliminary decision, the second 3-D view pixel data of the bottom portion may be inspected and/or analyzed to make a second preliminary decision, and then a final decision may be made based on the two preliminary decisions. The final decision may be utilized to process the multi-view frame as a whole and may, for example, be an average or compromise between the two preliminary decisions.

TABLE 2

Over-Under-Single-Frame Arrangement

| | Col. 1-4M |
|---|---|
| Lines 1-2N | first 3-D view |
| Lines 2N + 1-4N | second 3-D view |

The vertically-interleaved-single-frame arrangement 208 may alternate between one or more lines of left-view pixel data and one or more lines of right-view pixel data. An exemplary 4M×4N vertically-interleaved-single-frame arrangement is described in table 2 below. In an embodiment of the invention, a decision as to how to perform one or more processing operations on the multi-view frame may be made based on an inspection and/or analysis of either the first 3-D view pixel data or the second 3-D view pixel data. This decision may then be utilized for processing the multi-view frame as a whole. In an embodiment of the invention, the first 3-D view pixel data may be inspected and/or analyzed to make a first preliminary decision, the second 3-D view pixel data may be inspected/analyzed to make a second preliminary decision, and then a final decision may be made based on the two preliminary decisions. The final decision may be utilized to process the multi-view frame as a whole and may, for example, be an average or compromise between the two preliminary decisions.

TABLE 3

Vertically-Interleaved-Single-Frame Arrangement

| | Col. 1-4M |
|---|---|
| Lines 1-N | first 3-D view |
| Lines N + 1-2N | second 3-D view |
| Lines 2N + 1-3N | first 3-D view |
| Lines 3N + 1-4N | second 3-D view |

The horizontally-interleaved-single-frame arrangement 210 may alternate between one or more columns of left-view pixel data and one or more columns of right-view pixel data. An exemplary 4M×4N horizontally-interleaved-single-frame arrangement is described in table 4 below. In an embodiment of the invention, a decision as to how to perform one or more processing operations on the multi-view frame may be made based on an inspection and/or analysis of either the first 3-D view pixel data or the second 3-D view pixel data. This decision may then be utilized for processing the multi-view frame as a whole. In an embodiment of the invention, the first 3-D view pixel data may be inspected and/or analyzed to make a first preliminary decision, the second 3-D view pixel data may be inspected and/or analyzed to make a second preliminary decision, and then a final decision may be made based on the two preliminary decisions. The final decision may be utilized to process the multi-view frame as a whole and may, for example, be an average or compromise between the two preliminary decisions.

TABLE 4

Horizontally-Interleaved-Single-Frame Arrangement

| | Col. 1-M | Col. M + 1-2M | Col. 2M + 1-3M | Col. 3M + 1-4M |
|---|---|---|---|---|
| Lines 1-4N | first 3-D view | second 3-D view | first 3-D view | second 3-D view |

In the vertically-and-horizontally-interleaved-single-frame arrangement 212, the first 3-D view and second 3-D view pixel data may be interleaved in both a vertical and horizontal direction. An exemplary 4M×4N horizontally-interleaved-single-frame arrangement is described in table 4 below. In an embodiment of the invention, a decision as to how to perform one or more processing operations on the multi-view frame may be made based on an inspection and/or analysis of either the first 3-D view pixel data or the second 3-D view pixel data. This decision may then be utilized for processing the multi-view frame as a whole. In an embodiment of the invention, the first 3-D view pixel data may be inspected and/or analyzed to make a first preliminary decision, the second 3-D view pixel data may be inspected and/or analyzed to make a second preliminary decision, and then a final decision may be made based on the two preliminary decisions. The final decision may be utilized to process the multi-view frame as a whole and may, for example, be an average or compromise between the two preliminary decisions.

TABLE 5

Vertically-and-Horizontally-Interleaved-Single-Frame Arrangement

| | Col. 1-M | Col. M + 1-2M | Col. 2M + 1-3M | Col. 3M + 1-4M |
|---|---|---|---|---|
| Lines 1-N | first 3-D view | second 3-D view | first 3-D view | second 3-D view |
| Lines N + 1-2N | second 3-D view | first 3-D view | second 3-D view | first 3-D view |
| Lines 2N + 1-3N | first 3-D view | second 3-D view | first 3-D view | second 3-D view |
| Lines 3N + 1-4N | second 3-D view | first 3-D view | second 3-D view | first 3-D view |

Figure 3:
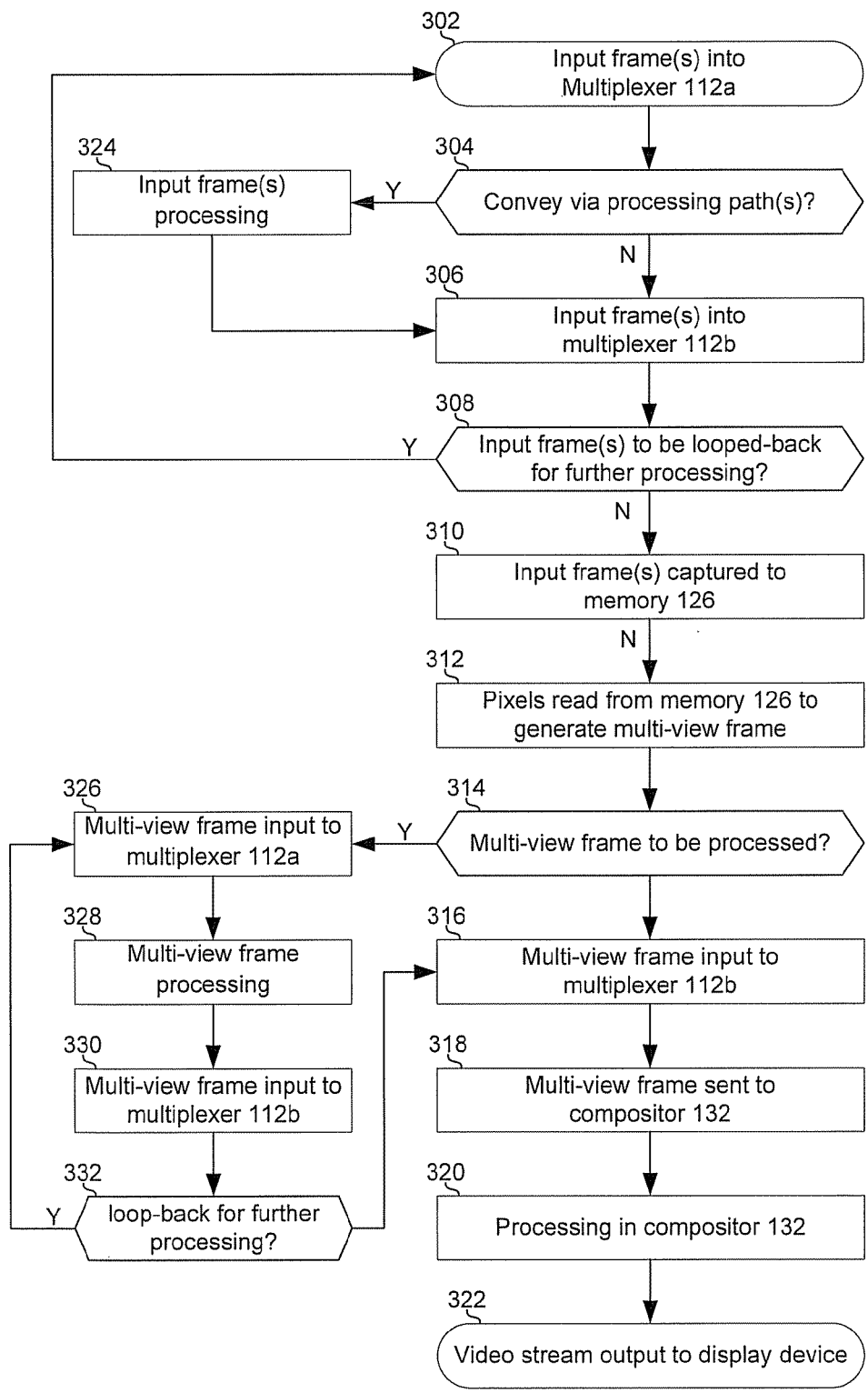
FIG. 3 is flow chart illustrating exemplary operation for processing 3-D pixel data, in accordance with an embodiment of the invention.

FIG. 3 is flow chart illustrating exemplary operation for processing 3-D video, in accordance with an embodiment of the invention. Referring to FIG. 3, the exemplary steps begin with step 302 in which an input frame is conveyed to the multiplexer 112a.

In step 304, it is determined whether the input frame(s) are to traverse one or more of the processing paths $114_1$-$114_J$ or traverse one or more of the bypass paths $116_1$-$116_K$. In instances that the input frame(s) are to traverse one or more of the processing paths $114_1$-$114_J$, then in step 324, processing, such as scaling and/or deinterlacing, may occur. In an embodiment of the invention, a decision as to how to perform one or more processing operations during step 324 may be made based on an inspection and/or analysis of the input frame(s). In instances that the input frame(s) comprise a single multi-view frame, the decision may then be utilized for processing the multi-view frame as a whole. In instances that the input frame(s) comprise two single-view frames, the decision may then be utilized for processing both of the single-view frames. Accordingly, for processing the two single-view frames, the system 100 may need to remember decisions made for the first frame in order to apply the decisions to the second frame. Accordingly, in an embodiment of the invention, in order to avoid the need for such memory of the decisions, processing may be held off until after the two single-view frames have been converted to a single multi-view frame. This may reduce the cost and complexity of the processing paths $114_1$-$114_J$.

In step 306, the input frame(s) are conveyed to the multiplexer 112b. In step 308, it is determined whether the input frame(s) are to be looped-back to multiplexer 112a for another traversal of one or more of the processing paths $114_1$-$114_J$ and/or one or more of the bypass paths $116_1$-$116_K$. In instances that the input frame(s) are to be looped-back, the exemplary steps may return to step 302. In instances that the input frame(s) are not to be looped-back, the exemplary steps may advance to step 310.

In step 310, the input frame(s) are captured to memory 126. First 3-D view pixel data of the input frame(s) may be stored to memory location(s) indicated by a first one or more memory pointers. Second 3-D view pixel data of the input frame(s) may be stored to memory location(s) indicated by a second one or more memory pointers.

In step 312, the left-view pixel data and right-view pixel data is read from memory 126 to generate a multi-view output frame. The order in which the data is read from memory 126 may depend on the desired arrangement of the multi-view output frame.

In step 314, it is determined whether the multi-view output frame is be processed by one or more of the processing paths $114_1$-$114_J$. In instances that the multi-view output frame is to be processed, then the exemplary steps may advance to step 326.

In step 326, the multi-view output frame is communicated to the multiplexer 1128. In step 328, the multi-view output frame is conveyed onto one or more of the processing paths $114_1$-$114_J$ for processing, such as scaling and/or noise reduction. In an embodiment of the invention, a decision as to how to perform one or more processing operations on the multi-view output frame may be made based on an inspection/analysis of either the first 3-D view pixel data or the second 3-D view pixel data. This decision may then be utilized for processing the multi-view output frame as a whole. In an embodiment of the invention, the first 3-D view pixel data may be inspected/analyzed to make a first preliminary decision, the second 3-D view pixel data may be inspected/analyzed to make a second preliminary decision, and then a final decision may be made based on the two preliminary decisions. The final decision may be utilized to process the multi-view output frame as a whole and may, for example, be an average or compromise between the two preliminary decisions.

In step 330, the multi-view output frame may arrive at the multiplexer 112b. In step 332 it is determined whether the multi-view output frame is to be looped-back to multiplexer 112a for another traversal of one or more of the processing paths processing paths $114_1$-$114_J$ and/or one or more of the bypass paths $116_1$-$116_K$. In instances that the multi-view output frame is to be looped-back, the exemplary steps may return to step 226. In instances that the multi-view output frame is not to be looped-back, the exemplary steps may advance to step 316.

In step 316, the multi-view output frame arrives at the multiplexer 112b. In step 318, the multi-view output frame is conveyed to the compositor 122. In step 320, the compositor may process the multi-view output frame to make them suitable for insertion into a video stream. Processing the multi-view output frame may comprise combining the multi-view output frame from the multiplexer 112b with pixel data from memory 124. For example, graphics may be read from the memory 124 and overlaid on the multi-view output frame from the multiplexer 112b.

In step 322, the video stream may be communicated to another video device, such as a television or monitor. The video stream may, for example, be formatted in accordance with one or more video standards such as VGA, composite video, component video, HDMI, and/or DisplayPort.

Figure 4:
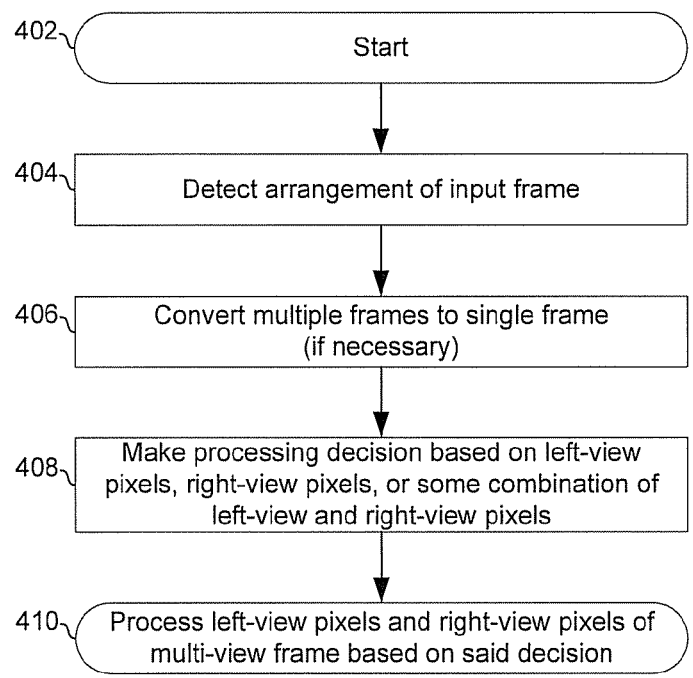
FIG. 4 is flow chart illustrating exemplary operation for processing 3-D pixel data, in accordance with an embodiment of the invention.

FIG. 4 is a flow chart illustrating exemplary steps for processing 3-D pixel data, in accordance with an embodiment of the invention. Referring to FIG. 4, after start step 402, in step 404, the system 100 may detect the arrangement of a multi-view frame to be processed. The system 100 may detect the arrangement based on, for example, an inspection of the multi-view frame, the source from which the multi-view frame were received, and/or based on a pre-configuration of the system 100. In step 406, if the detected arrangement comprises multiple single-view frames, then the single-view frames may be converted to a single, multi-view frame.

In step 408, the system 100 may make a decision as to how to process the multi-view frame. In an embodiment of the invention, the decision may be based on either first 3-D view, for example left-view, pixel data of the multi-view frame or second 3-D view, for example, right-view, pixel data of the multi-view frame. In an embodiment of the invention, a preliminary decision may be based on the first 3-D view pixel data, a second preliminary decision may be based on the second 3-D view pixel data, and then the ultimate decision as to how the multi-view frame is processed may be based on a combination of the two preliminary decisions. In step 410, the multi-frame may be processed as a whole utilizing the decision made in step 406. As a result, the first 3-D view pixel data may be processed in the same manner as the second 3-D view pixel data.

Various aspects of the invention may be found in a method and system for processing 3-D video. In various embodiments of the invention, a video processing system 100 may receive a first frame comprising pixel data for a first 3-D view of an image and receive a second frame comprising pixel data for a second 3-D view of an image. The system 100 may generate a 3-D multi-view frame comprising the pixel data for the first 3-D view and the pixel view for the second 3-D view. The system 100 may make a decision for performing processing of the image. The decision may be generated based on one or both of the pixel data for the first view and the pixel data for the second view. The 3-D multi-view frame may be processed based on the decision. The image processing operation may comprise, for example, deinterlacing, filtering, and cadence processing such as 3:2 pulldown. For 3:2 pulldown, the decision may determine whether the pixel data originated as video or film.

The multi-view frame may be arranged such that a left portion of the multi-view frame comprises the first 3-D view pixel data and a right portion of the multi-view frame comprises the second 3-D view pixel data. The multi-view frame may be arranged such that a top portion of the multi-view frame comprises the first 3-D view pixel data and a bottom portion of the multi-view frame comprises the second 3-D view pixel data. The multi-view frame may be arranged such that the first 3-D view pixel data is interleaved with the second 3-D view pixel data. The generated decision may be based on a first preliminary decision based on the first 3-D view pixel data, and a second preliminary decision based on the second 3-D view pixel data. The decision may be an average and/or compromise between the first preliminary decision and the second preliminary decision. The average and/or compromise may comprise weighting and/or some form of blending.

The multi-view frame may be generated by writing the first 3-D view pixel data to one or more locations in the memory 126 identified by a first one or more pointers, and writing the second 3-D view pixel data to one or more locations in the memory 126 identified by a second one or more pointers. The pixel data for the first 3-D view and the pixel data for the second 3-D view may be read from the memory 126 in an order that may be different than an order in which the first 3-D view pixel data and the second 3-D view pixel data was written to the memory 126.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for processing 3-D video.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a 3-D video processing system:
      receiving a first frame comprising pixel data for a first 3-D view of an image and receiving a second frame comprising pixel data for a second 3-D view of said image;
      generating a 3-D multi-view frame comprising said pixel data for said first 3-D view and said pixel data for said second 3-D view, wherein said generation of said 3-D multi-view frame comprises:
         generating a first preliminary decision based on said pixel data for said first 3-D view, wherein the first preliminary decision identifies processing for the first 3-D view, the identified processing comprising at least one of: sharpening the first 3-D view, adjust the color of the first 3-D view, scaling the first 3-D view, applying motion compensated temporal filtering to the first 3-D view, performing cadence processing, or performing digital noise reduction of the first 3-D view;
         generating a second preliminary decision based on said pixel data for said second 3-D view, wherein the second preliminary decision identifies processing for the second 3-D view, the processing identified by the second preliminary decision comprising at least one of: sharpening the second 3-D view, adjusting the color of the second 3-D view, scaling the second 3-D view, applying motion compensated temporal filtering of the second 3-D view, performing cadence processing, or performing digital noise reduction of the second 3-D view;
         generating a decision common between said first 3-D view and said second 3-D view for performing common processing of said image across said first 3-D view and said second 3-D view, based on an average or compromise between the processing identified by the first preliminary decision and the processing identified by the second preliminary decision; and
         processing said 3-D multi-view frame based on said decision.

2. The method according to claim 1, wherein said common processing of said image further comprises deinterlacing.

3. The method according to claim 1, wherein said decision further comprises determining whether said pixel data for said first 3-D view or said pixel data for said second 3-D view originated as video or film.

4. The method according to claim 1, wherein said common processing of said image comprises filtering.

5. The method according to claim 1, wherein said multi-view frame is arranged such that a left portion of said multi-view frame comprises said pixel data for said first 3-D view and a right portion of said multi-view frame comprises said pixel data for said second 3-D view.

6. The method according to claim 1, wherein said multi-view frame is arranged such that a top portion of said multi-view frame comprises said pixel data for said first 3-D view and a bottom portion of said multi-view frame comprises said pixel data for said second 3-D view.

7. The method according to claim 1, wherein said multi-view frame is arranged such that said pixel data for said first 3-D view is interleaved with said pixel data for said second 3-D view.

8. The method according to claim 1, wherein the average or compromise comprises weighting or blending the processing identified by the first preliminary decision and the processing identified by the second preliminary decision.

9. The method according to claim 1, comprising generating said multi-view frame by:
   writing said pixel data for said first 3-D view to one or more locations in memory identified by a first one or more pointers;
   writing said pixel data for said second 3-D view to one or more locations in memory identified by a second one or more pointers; and
   reading said pixel data for said first 3-D view and said pixel data for said second 3-D view from memory in an order that is different than an order in which said pixel data for said first 3-D view and said pixel data for said second 3-D view was written to memory.

10. A system comprising:
one or more circuits, one or more processors, or any combination thereof for use in a 3-D video processing system, said one or more circuits, one or more processors, or any combination thereof being operable to:
receive a first frame comprising pixel data for a first 3-D view of an image and receiving a second frame comprising pixel data for a second 3-D view of said image;
generate a 3-D multi-view frame comprising said pixel data for said first 3-D view and said pixel data for said second 3-D view, wherein said generation of said 3-D multi-view frame comprises:
generate a first preliminary decision based on said pixel data for said first 3-D view, wherein the first preliminary decision identifies processing for the first 3-D view, the identified processing comprising at least one of: sharpening the first 3-D view, adjusting the color of the first 3-D view, scaling the first 3-D view, applying motion compensated temporal filtering to the first 3-D view, performing cadence processing, or performing digital noise reduction of the first 3-D view;
generate a second preliminary decision based on said pixel data for said second 3-D view, wherein the second preliminary decision identifies processing for the second 3-D view, the processing identified by the second preliminary decision comprising at least one of sharpening the second 3-D view, adjusting the color of the second 3-D view, scaling the second 3-D view, applying motion compensated temporal filtering of the second 3-D view, performing cadence processing, or performing digital noise reduction of the second 3-D view;
generate a decision common between said first 3-D view and said second 3-D view for performing common processing of said image across said first 3-D view and said second 3-D view, based on an average or compromise between the processing identified by the first preliminary decision and the processing identified by the second preliminary decision; and
process the 3-D multi-view frame based on said decision.

11. The system according to claim 10, wherein said common processing of said image further comprises deinterlacing.

12. The system according to claim 10, wherein said decision includes a determination of whether said pixel data for said first 3-D view or said pixel data for said second 3-D view originated as video or film.

13. The system according to claim 10, wherein said common processing of said image comprises filtering.

14. The system according to claim 10, wherein said multi-view frame is arranged such that a left portion of said multi-view frame comprises said pixel data for said first 3-D view and a right portion of said multi-view frame comprises said pixel data for said second 3-D view.

15. The system according to claim 10, wherein said multi-view frame is arranged such that a top portion of said multi-view frame comprises said pixel data for said first 3-D view and a bottom portion of said multi-view frame comprises said pixel data for said second 3-D view.

16. The system according to claim 10, wherein said multi-view frame is arranged such that said pixel data for said first 3-D view is interleaved with said pixel data for said second 3-D view.

17. The system according to claim 10, wherein the average or compromise comprises weighting or blending the processing identified by the first preliminary decision and the processing identified by the second preliminary decision.

18. The system according to claim 10, wherein said one or more circuits, one or more processors, or any combination thereof are configured to generate said multi-view frame by:
writing said pixel data for said first 3-D view to one or more locations in memory identified by a first one or more pointers;
writing said pixel data for said second 3-D view to one or more locations in memory identified by a second one or more pointers; and
reading said pixel data for said first 3-D view and said pixel data for said second 3-D view from memory in an order that is different than an order in which said pixel data for said first 3-D view and said pixel data for said second 3-D view was written to memory.

19. A non-transitory computer readable medium having a program that, when executed by processing circuitry, causes the processing circuitry to:
generate a first preliminary decision based on pixel data for a first 3-D view, wherein the first preliminary decision identifies processing for the first 3-D view, the identified processing comprising at least one of: sharpening the first 3-D view, adjusting the color of the first 3-D view, scaling the first 3-D view, applying motion compensated temporal filtering to the first 3-D view, performing cadence processing, or performing digital noise reduction of the first 3-D view;
generate a second preliminary decision based on pixel data for a second 3-D view, wherein the second preliminary decision identifies processing for the second 3-D view, the processing identified by the second preliminary decision comprising at least one of sharpening the second 3-D view, adjusting the color of the second 3-D view, scaling the second 3-D view, applying motion compensated temporal filtering of the second 3-D view, performing cadence processing, or performing digital noise reduction of the second 3-D view;
generate a decision common between said first 3-D view and said second 3-D view for performing common processing across the first 3-D view and the second 3-D view based on an average or compromise between the processing identified by the first preliminary decision and the processing identified by the second preliminary decision; and
process the 3-D multi-view frame based on the decision.

20. The non-transitory computer readable medium of claim 19, wherein the average or compromise comprises weighting or blending the processing identified by the first preliminary decision and the processing identified by the second preliminary decision.

* * * * *